(12) United States Patent  (10) Patent No.: US 9,086,106 B2
Lelievre et al.  (45) Date of Patent: Jul. 21, 2015

(54) FLEXIBLE FRICTION PAD AND BRAKE LINING PROVIDED WITH SUCH A PAD

(75) Inventors: Loic Lelievre, Colombes (FR); Gwenael Cabouro, Courbevoie (FR)

(73) Assignee: FAIVELEY TRANSPORT, Gennevilliers (FR)

( * ) Notice: Subject to any disclaimer, the term of this patent is extended or adjusted under 35 U.S.C. 154(b) by 0 days.

(21) Appl. No.: 13/997,901

(22) PCT Filed: Dec. 22, 2011

(86) PCT No.: PCT/FR2011/053152
§ 371 (c)(1),
(2), (4) Date: Jul. 18, 2013

(87) PCT Pub. No.: WO2012/089968
PCT Pub. Date: Jul. 5, 2012

(65) Prior Publication Data
US 2013/0284550 A1  Oct. 31, 2013

(30) Foreign Application Priority Data
Dec. 28, 2010  (FR) ...................................... 10 05140

(51) Int. Cl.
F16D 65/04  (2006.01)
F16D 65/00  (2006.01)
F16D 65/092  (2006.01)
F16D 69/04  (2006.01)
F16D 69/00  (2006.01)

(52) U.S. Cl.
CPC ............ *F16D 65/04* (2013.01); *F16D 65/0006* (2013.01); *F16D 65/092* (2013.01); *F16D 69/0408* (2013.01); *F16D 2069/007* (2013.01)

(58) Field of Classification Search
USPC ........ 188/250 B, 250 C, 250 D, 250 E, 250 G
See application file for complete search history.

(56) References Cited

U.S. PATENT DOCUMENTS

| 2,451,326 | A |   | 10/1948 | Eksergian et al. |
| 3,638,765 | A | * | 2/1972  | Flaherty et al. ............ 188/73.38 |
| 4,241,812 | A | * | 12/1980 | Burgdorf et al. ............ 188/73.1 |

(Continued)

FOREIGN PATENT DOCUMENTS

| DE | 1575774 B  | 1/1971 |
| EP | 1167809 A2 | 1/2002 |

OTHER PUBLICATIONS

International Seach Report and Written Opinion issued in PCT/FR2011/053152, mailed May 4, 2012, 12 pages.

*Primary Examiner* — Christopher Schwartz
(74) *Attorney, Agent, or Firm* — Arent Fox LLP

(57) ABSTRACT

Friction pad (1) for mounting on a brake lining, including a base (11) and at least one first friction material block (12), which is attached to at least one portion of said base (11), the base (11) and the first friction material block (12) defining a first plane at the interface thereof. The base (11) has: a mounting bracket (111) to which the at least first friction material block (12) is attached, at least one first hooking interface (112) distant from the mounting bracket (111) in a direction parallel to the first plane, for directly or indirectly attaching the pad (1) to the brake lining, and at least one first neck (113) extending parallel to the first plane, forming a resilient leaf between the mounting bracket (111) and the first hooking interface (112), to enable the mounting bracket (111) to accommodate translational and rotational movements in every direction.

15 Claims, 4 Drawing Sheets

(56) References Cited

U.S. PATENT DOCUMENTS

| | | | |
|---|---|---|---|
| 4,762,214 A | | 8/1988 | Hadaway |
| 5,396,972 A | * | 3/1995 | Grele ........................ 188/250 G |
| 5,407,034 A | * | 4/1995 | Vydra et al. ............... 188/73.37 |
| 5,538,108 A | * | 7/1996 | Russo ........................ 188/250 E |
| 6,367,594 B1 | * | 4/2002 | Barbosa et al. ............. 188/73.1 |
| 7,648,007 B2 | * | 1/2010 | Russo et al. ............... 188/250 E |
| 8,544,617 B2 | * | 10/2013 | De Soccio .................... 188/235 |

\* cited by examiner

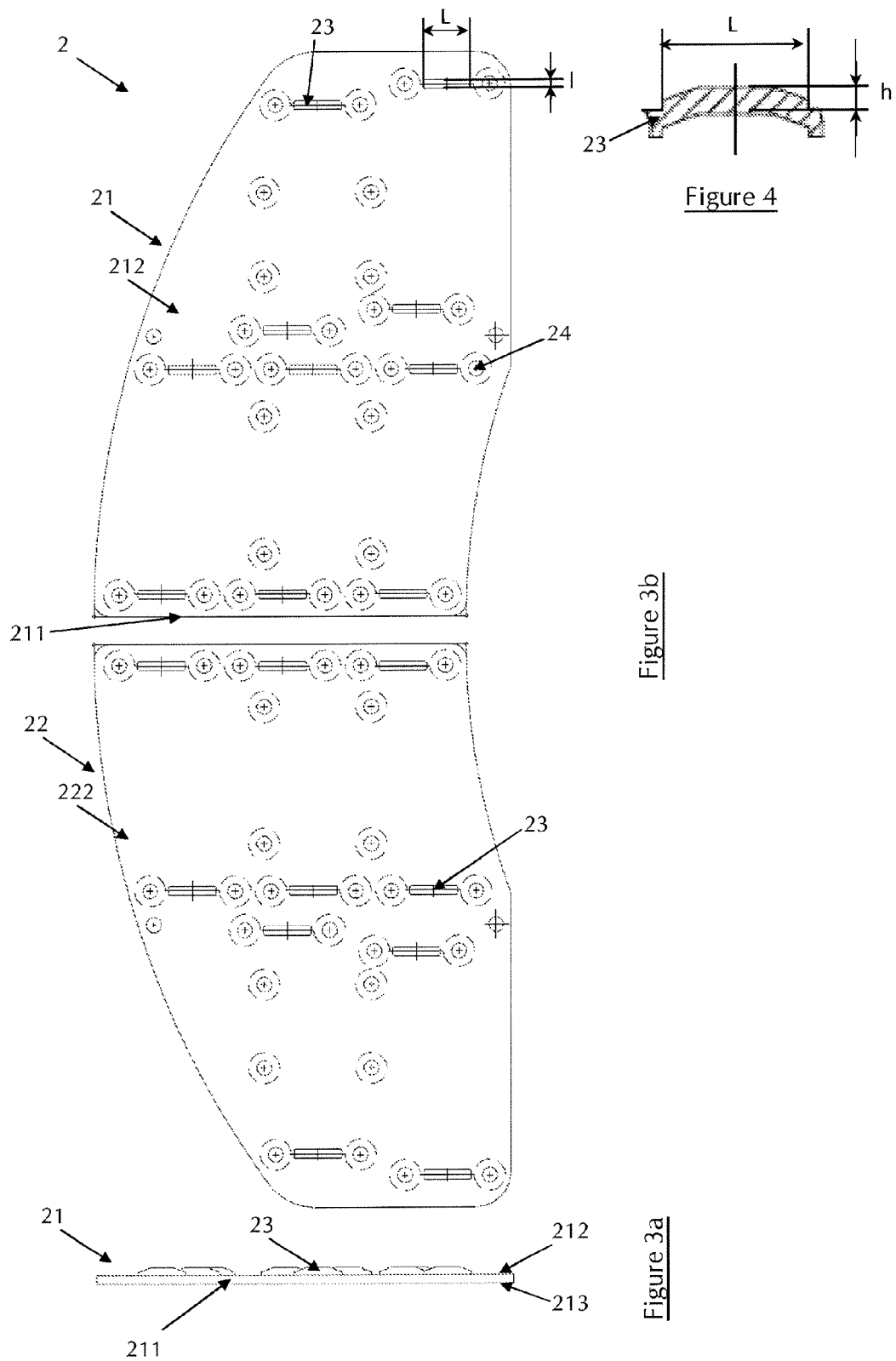

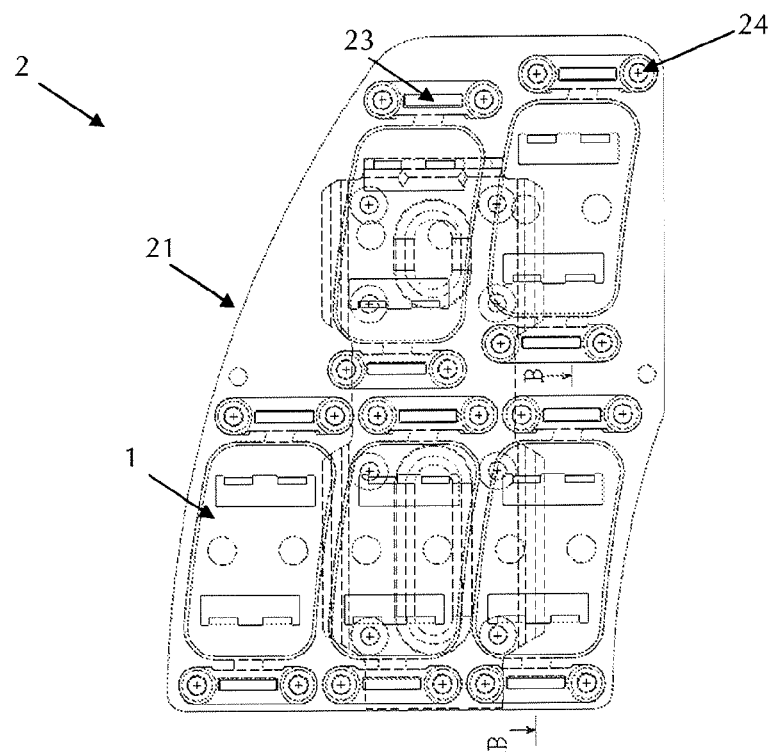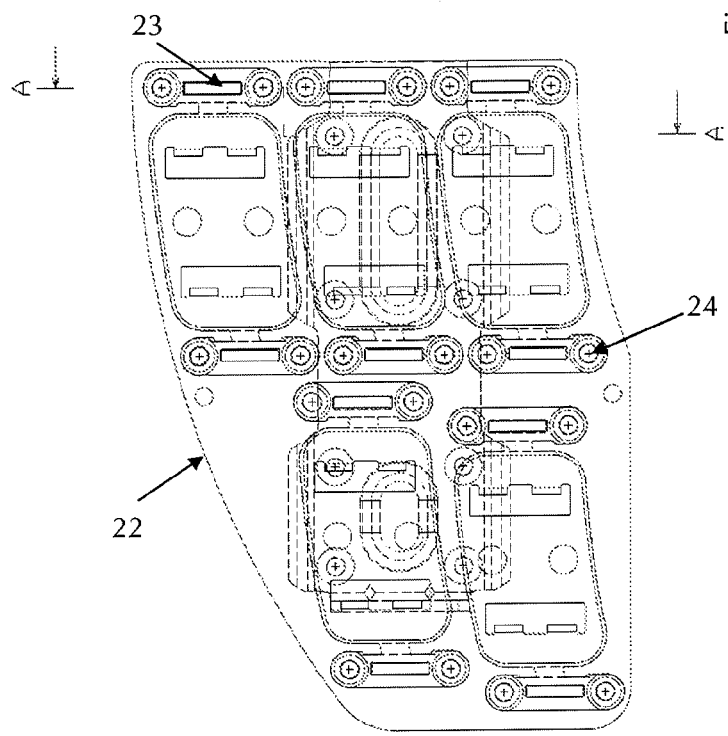
Figure 5

FLEXIBLE FRICTION PAD AND BRAKE LINING PROVIDED WITH SUCH A PAD

CROSS-REFERENCE TO RELATED APPLICATIONS

This application is a National Stage entry of International Application No. PCT/FR2011/053152, filed Dec. 22, 2011, which claims priority to French Application No. 1005140, filed Dec. 28, 2010. The disclosures of the prior applications are hereby incorporated in their entirety by reference.

This invention relates to disc brake linings and the brackets intended to receive the friction elements.

Brake linings, in particular for railway vehicles, are generally comprised of at least one base plate used as a bracket whereon are attached one or several pads, comprising a friction material block. For example European patent applications EP1679452 and EP1957820 are known which disclose such brake linings. Outside of applications for light railway vehicles, the same brake lining comprises generally several base plates each, often two per brake disc surface, provided with one or several pads and mobile in relation to one surface of the brake disc.

However, the rigidity of the mounting of the pads on the base element can generate not only premature and irregular wear of the friction materials due to flatness and parallelism defects between the friction surface of the friction materials and the surface of the disc during braking, but also intense stress in the friction materials and in their mounting elements on the base element. Furthermore, the vibrations induced during braking are generally at the origin of screeching noises that one seeks to minimise, and it is preferable that the friction elements be spaced in such a way as to improve the thermographic image of the lining with regards to the disc during braking, as well as to facilitate their cooling and the removal of debris from wear.

One of the purposes of this invention is then to limit all or a portion of the aforementioned disadvantages.

To this effect is proposed, according to a first aspect of the invention, a friction pad intended to be mounted on a base element bracket, with the pad comprising a base and at least one first friction material block, the first friction material block being attached to at least one portion of said base, the base and the first friction material block defining a first plane at the interface thereof, the base of said pad further having:
 a mounting bracket to which is attached at least the first friction material block,
 at least one first hooking interface distant from the mounting bracket in a direction parallel to the first plane, for directly or indirectly attaching the pad to the base element bracket, and
 at least one first neck extending parallel to the first plane, forming a resilient leaf between the mounting bracket and the first hooking interface, in order to enable the mounting bracket to accommodate translational and rotational movements in every direction.

The neck forming a resilient leaf constitutes a privileged deformation zone. As such, when the pad is mounted on the base element, the forces due to the braking transmitted to the hooking interface are minimised.

More preferably, the base has a thickness between 0.5 and 5 millimetres, more preferably of 2 millimetres, in particular on the mounting bracket and on the first hooking interface. The neck more preferably has a thickness at most equal to that of the mounting bracket or of the first hooking interface in order to be deformed by minimising the stress transmitted to the hooking interface.

More preferably, at least the first hooking interface comprises at least one hooking point. The hooking point is for example constituted by a hole which then makes it possible to attach the base of the pad to the base element, for example by rivets. More preferably, the first hooking interface comprises at least two hooking points, for example two holes distant from one another.

More preferably, at least the first hooking interface has at least one first relief of the force and/or torque take-up. Indeed, it is preferable that the means for attaching the base be dissociated from the force take-up zones.

According to an example embodiment, this first relief of the force and/or torque take-up is a housing.

According to another example embodiment, the pad, more preferably on the mounting bracket, has at least one first anchoring tab of the friction material block.

According to a preferred embodiment, the pad has two separate hooking interfaces, distant from the mounting bracket in a direction parallel to the first plane, the first hooking interface and the second hooking interface being connected to the mounting bracket respectively by a first and a second neck. As such, the mounting bracket having the friction material block is able to be displaced according to all directions and the stress generated transmitted to the hooking interfaces is minimised.

More preferably, the first and the second hooking interfaces each include two hooking points separate from one another. A geometric centre can then be defined for each hooking point, and in what follows A and A' shall designate the centres of the hooking points of the first hooking interface, and B and B' those of the second hooking interface.

According to an example embodiment, each base has a first relief and a second relief of the force and/or torque take-up. The first relief is more preferably located between the two hooking points of the first hooking interface and the second relief is more preferably located between the two hooking points of the second hooking interface.

Advantageously, the two hooking points of the first hooking interface are separated by the same distance d as the two hooking points of the second hooking interface. This distance d is the length of the segment joining the centres of the two hooking points of the same hooking interface, i.e. [AA']=d and [BB']=d. More generally there can be an interest in that the geometry of the hooking points of the first interface be identical to that of the hooking points of the second interface, in such a way as to facilitate their mounting by the same tool.

More preferably, the friction material block of a pad has a friction surface between 10 and 600 cm2, in such a way that, according to the number of pads per lining, a total friction surface of the lining on a brake disc surface for example between 200 and 600 cm2 is obtained.

More preferably, at least one of the sides of the quadrilateral forming the mounting bracket is curved. As such, the shape of the pads makes it possible to follow the shape of a base element to which said pads are intended to be attached.

More preferably, the friction material block is sintered on the mounting bracket of said base, as is usual in this type of technology.

According to another aspect of the invention, a brake lining is also proposed, in one or several portions, more preferably with two symmetrical portions, each portion comprising:
 a base element, having a front surface, and a dorsal surface on the side of which can be attached a dovetail rail,
 at least one first friction pad such as defined hereinabove, attached to the side of the front surface of the base element.

More preferably, the base element of each portion of the brake lining comprises at least one mounting point, for example a bore, able to cooperate with a hooking point of a hooking interface of the first pad. For example, the bore is able to receive a rivet to attach the pad. More preferably, at least the first pad is attached by at least one hooking point to a mounting point of the base element of the brake lining thanks to a rivet.

Advantageously, the base element of each portion of the brake lining has at least one relief complementary to the relief of the force and/or torque take-up of said pad.

More preferably, the relief complementary to the relief of the force and/or torque take-up is a half-shear. The half-shear can be constituted by a protuberance, for example, of rectangular shape, of length L, width w and height h. More preferably, h is greater than w and L/w is between 1 and 10.

Advantageously, the mounting bracket of said pad and the front surface of the base element to which the first pad is attached define a space between them. This space can include an intermediate layer, more preferably, made of damping material, where applicable thermal insulation in order to dampen the vibrations, in particular in the portion of the spectrum that generates noises such as screeching, and limit where applicable the transmission of heat between the base and the base element of the brake lining.

More preferably, each base element of the lining comprises several pads, for example five pads.

The invention, according to a preferred embodiment, shall be well understood and its advantages shall appear better when reading the following detailed description, provided for the purposes of information and in no way restrictive, and in reference to the annexed drawings shown hereinafter:

Figure 1:
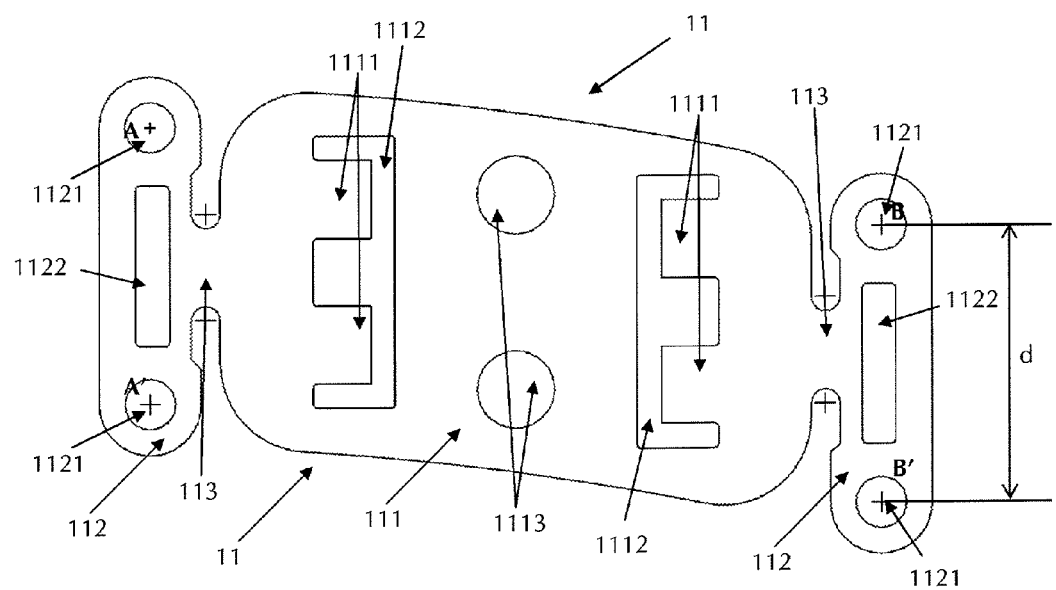
FIG. 1, shows a plan view of a base of a pad according to the invention.
Figure 2:
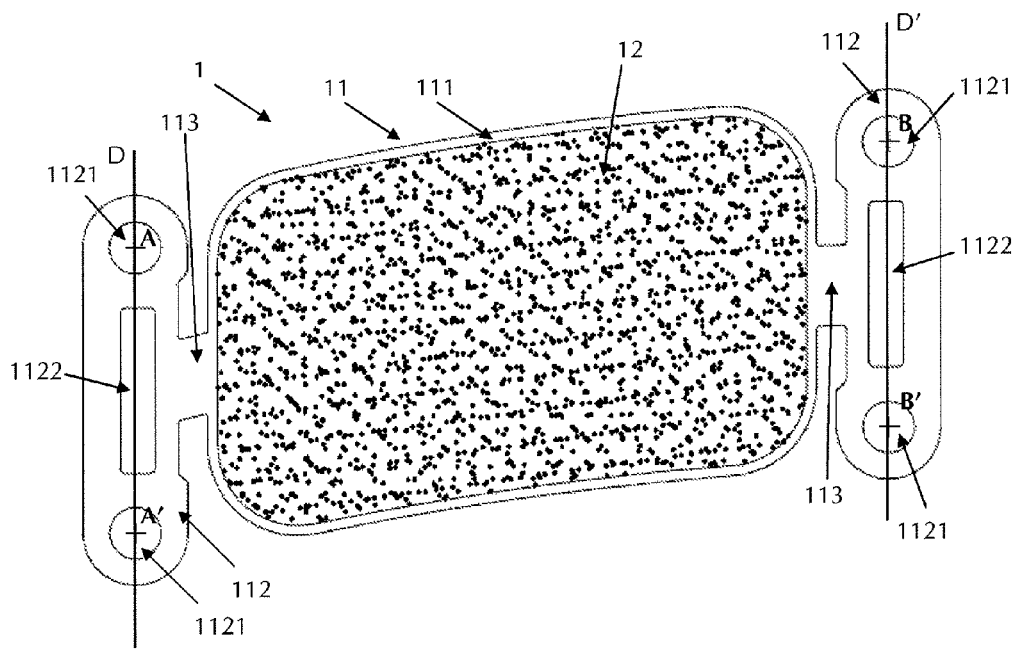
FIG. 2 shows a pad according to the invention.
Figure 6:
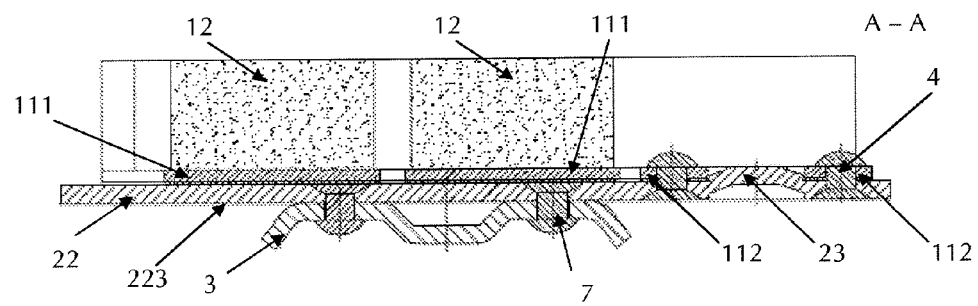
Figure 7:
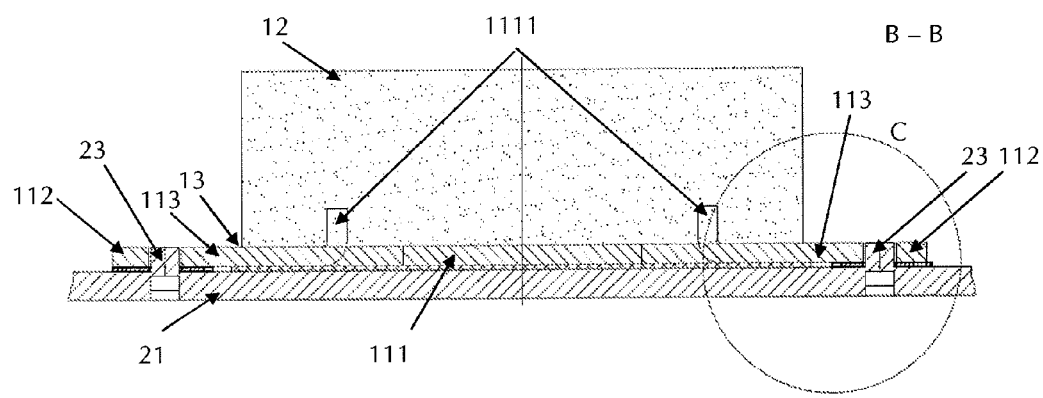
Figure 8:
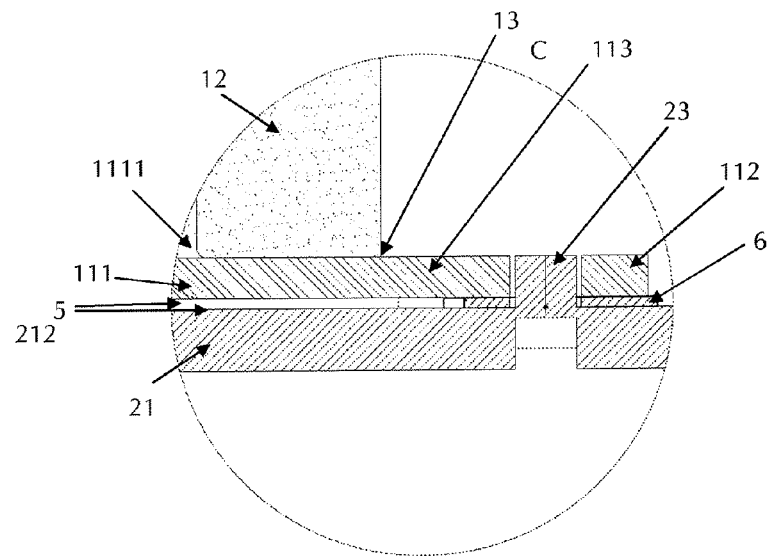

FIG. 3 shows a brake lining base element in two portions according to the invention intended to receive pads according to FIG. 1 or 2, FIG. 4 is a cross-section view of a half-shear, FIG. 5 is a brake lining in two portions according to the invention with pads, FIG. 6 is a cross-section of the brake lining of the FIG. 5 according to A-A, FIG. 7 is a cross-section of the brake lining of the FIG. 5 according to B-B, FIG. 8 is a detailed view of the zone C of FIG. 7.

The identical elements shown in FIGS. 1 to 8 are identified with identical numerical references.

A friction pad 1 according to the invention, intended to be mounted on a brake lining 2 in one or several portions, comprises a base 11 and a friction material block 12.

According to this embodiment, the base 11 has
a mounting bracket 111 on which can be attached the friction material block 12, for example by sintering,
two hooking interfaces 112 for directly or indirectly attaching the pad 1 to a base element (21, 22) of a brake lining 2,
and two necks 113 forming a resilient leaf between the mounting bracket 111 and each one of the two hooking interfaces 112.

The base can be formed using a thin sheet, for example 2 mm thick.

The mounting bracket 111 has a quadrilateral shape of which the large sides are slightly rounded in order to better follow the shape of the base element (21, 22) of a brake lining 2 to which it is intended to be attached.

The mounting bracket 111 has at least one first anchoring tab 1111 of the friction material block 12, here four anchoring tabs 1111. The anchoring tabs 1111 can also be formed by stamping, even by laser cutting of the sheet forming the base 11. Pierced zones 1112 can also be formed with apparent surfaces that are more or less large than those shown in FIG. 1, but it is however preferable to ensure that the mounting bracket retains sufficient rigidity, left to the appreciation of the design office. The anchoring tabs 1111 can then be folded back in the direction of the surface of the mounting bracket 111 whereon the friction material block 12 shall be sintered. The anchoring tabs 1111 folded back will be able to sink into the friction material when the latter is put into place. Moreover, when the friction material block 12 is attached to the surface of the mounting bracket 111, they define an interface 13 between them.

The mounting bracket 111 can also have recesses 1113, which are here circular holes that can reinforce the role of the anchoring tabs, or even replace them.

The hooking interfaces 112 comprise at least one hooking point 1121. Here, these hooking points 1121 are constituted by circular holes. Holes make it possible to attach the pad 1 to the base element (21, 22) of a brake lining 2, for example, thanks to a rivet 4. The centres of these hooking points 1121 are arbitrarily names here: A and A' for the hooking points 1121 of the first hooking interface 112, and B and B' for the hooking points 1121 of the second hooking interface 112. In order to facilitate mounting, the two hooking points 1121 of the first hooking interface are preferably separated by the same distance d as the two hooking points 1121 of the second hooking interface 112. This distance d is the length of the segment joining the centres A, A' or B, B' of the two hooking points 1121 of the same hooking interface 112, i.e. [AA']=d and [BB']=d.

Each hooking interface 112 further has at least one first relief of the force and/or torque take-up 1122 because it is necessary for the forces to not be taken up par the hooking points 1121. According to these example embodiments, the reliefs of the force and/or torque take-up 1122 are a housing of rectangular shape. These reliefs of the force and/or torque take-up 1122 are able to cooperate with complementary reliefs formed in the base element (21, 22) of the brake lining 2.

The necks 113 are dimensioned so as to form a privileged deformation zone, which enables the mounting bracket 111 to accommodate translational and rotational movements in every direction by limiting the forces and/or the torques transmitted to the hooking interfaces 112. The shape of the necks 113 can vary. For example, according to the example embodiment of FIG. 1, the latter are formed by rounded cut-outs between the mounting bracket 111 and each of the hooking interfaces 112, while in the example embodiment of FIG. 2, the edges of the necks 113 are straight and parallel to each other. In addition, in the example embodiment of FIG. 2, the edges of the necks 113 form and angle with the mounting bracket 111 which can be a right angle.

The brake lining according to these example embodiments comprises two portions, with each portion comprising:
a base element (21, 22), having a front surface (212, 222), and a dorsal surface (213, 223) on the side of which can be attached a dovetail rail 3 for example by rivets 7, the base element (21, 22) can be carried out using a thin sheet, for example with a thickness of 3 mm;
at least one first pad 1 attached to the side of the front surface (212, 222) of the base element (21, 22).

The base elements (21, 22) comprising the first and the second portion of the brake lining 2 are symmetrical. Each portion of the brake lining 2 is able to include five pads 1.

The base elements (21, 22) comprise at least one mounting point 24, for example a bore, to attach the pad 1 by the hooking points 1121 of its hooking interfaces 112, for example thanks to rivets 4.

The base elements (21, 22) also comprise at least one relief complementary 23 to the relief of the force and/or torque take-up 1122 of said pad, for example a half-shear able to cooperate with the housings of the hooking interface 112 of said first pad 1. A half-shear is a protuberance, for example carried out by stamping the sheet forming the base element (21, 22) of the brake lining 2. A half-shear such as shown is of rectangular shape, of length L, of width a and of height h. FIG. 4 shows a section of the half-shear according to its length L. The half-shear more preferably has a profile such that it makes it possible to guide the positioning of the housings of the hooking interface 112 for the setting in place of the pads 1. The half-shears can as such have rounded or pointed profiles, or be truncated as shown in FIG. 4. Such an expanded profile for forming the complementary reliefs 23, i.e. of which the base element is wider than the top, also makes it possible to take up any play between the dimensions of the complementary relief 23 and those of the corresponding relief of the force and/or torque take-up 1122. This absence of play is necessary so that the forces are taken up by the complementary reliefs 23, not by the hooking points 1121 and the mounting points 24.

A brake lining 2 according to the invention can also comprise a wedge 6, for example made of steel or of a malleable metal, even made of fabric. More preferably, this wedge 6 is inserted between each hooking interface 112 of a pad 1 and the front surface (212, 222) of the base element (21, 22) to which the pad 1 is attached, in order to raise the entire pad.

Furthermore, the mounting bracket 111 and the upper surface (212, 222) of the base element (21, 22) of the brake lining form a space 5 between them. This space 5 can begin an empty zone or be filled with insulation making it possible to retain the flexibility of the mounting bracket 111.

The invention claimed is:

1. Friction pad configured to be mounted on a brake lining, comprising a base and at least one first friction material block, the first friction material block being attached to at least one portion of said base, the base and the first friction material block defining a first plane at the interface thereof, wherein the base comprises:
   a mounting bracket to which is attached at least the first friction material block,
   at least one first hooking interface distant from the mounting bracket in a direction parallel to the first plane, for directly or indirectly attaching the pad to the brake lining, and
   at least one first neck extending parallel to the first plane, forming a resilient leaf between the mounting bracket and the first hooking interface, in order to enable the mounting bracket to accommodate translational and rotational movements.

2. Pad according to claim 1, wherein at least the first hooking interface comprises at least one hooking point.

3. Pad according to claim 1, wherein at least the first hooking interface has at least one force and/or take-up relief.

4. Pad according to claim 3, wherein said at least one force and/or take-up relief is a housing.

5. Pad as claimed in claim 1, having two separate hooking interfaces, distant from the mounting bracket in a direction parallel to the first plane, the first hooking interface and the second hooking interface being connected to the mounting bracket respectively by a first and a second neck.

6. Pad according to claim 5, wherein the first and the second hooking interfaces each include two hooking points.

7. as claimed in claim 1, wherein the friction material block is sintered on the mounting bracket of said base.

8. Brake lining comprising:
   a base element, having a front surface, and a dorsal surface on the side of which can be attached a dovetail rail,
   at least one first friction pad attached to the side of the front surface of the base element,
   wherein each first friction pad comprises a base and at least one first friction material block, the first friction material block being attached to at least one portion of said base, the base and the first friction material block defining a first plane at the interface thereof, and
   wherein the base comprises:
   a mounting bracket to which is attached at least the first friction material block,
   at least one first hooking interface distant from the mounting bracket in a direction parallel to the first plane, for directly or indirectly attaching the pad to the brake lining, and
   at least one first neck extending parallel to the first plane, forming a resilient leaf between the mounting bracket and the first hooking interface, in order to enable the mounting bracket to accommodate translational and rotational movements.

9. Brake lining according to claim 8, wherein the base element of each portion of the brake lining comprises at least one mounting point configured to cooperate with a hooking point of the hooking interface of the first pad.

10. Brake lining according to claim 8, wherein at least one hooking interface of the first pad is attached to one mounting point of the base element of the brake lining by a rivet.

11. Brake lining according to claim 8, wherein the base element of each portion of the brake lining has at least one relief complementary to the relief of the force and/or torque take-up of said pad.

12. Brake lining according to claim 11, wherein the relief complementary to the relief of the force and/or torque take-up is a half-shear.

13. Brake lining according to claim 8, wherein the mounting bracket of said pad and the front surface of the base element of the brake lining to which the first pad is attached defining a space between them.

14. Brake lining according to claim 13, wherein the space comprises a damping material.

15. Brake lining according to claim 8, wherein each portion of the brake lining comprises several pads.

* * * * *